Figure 1:
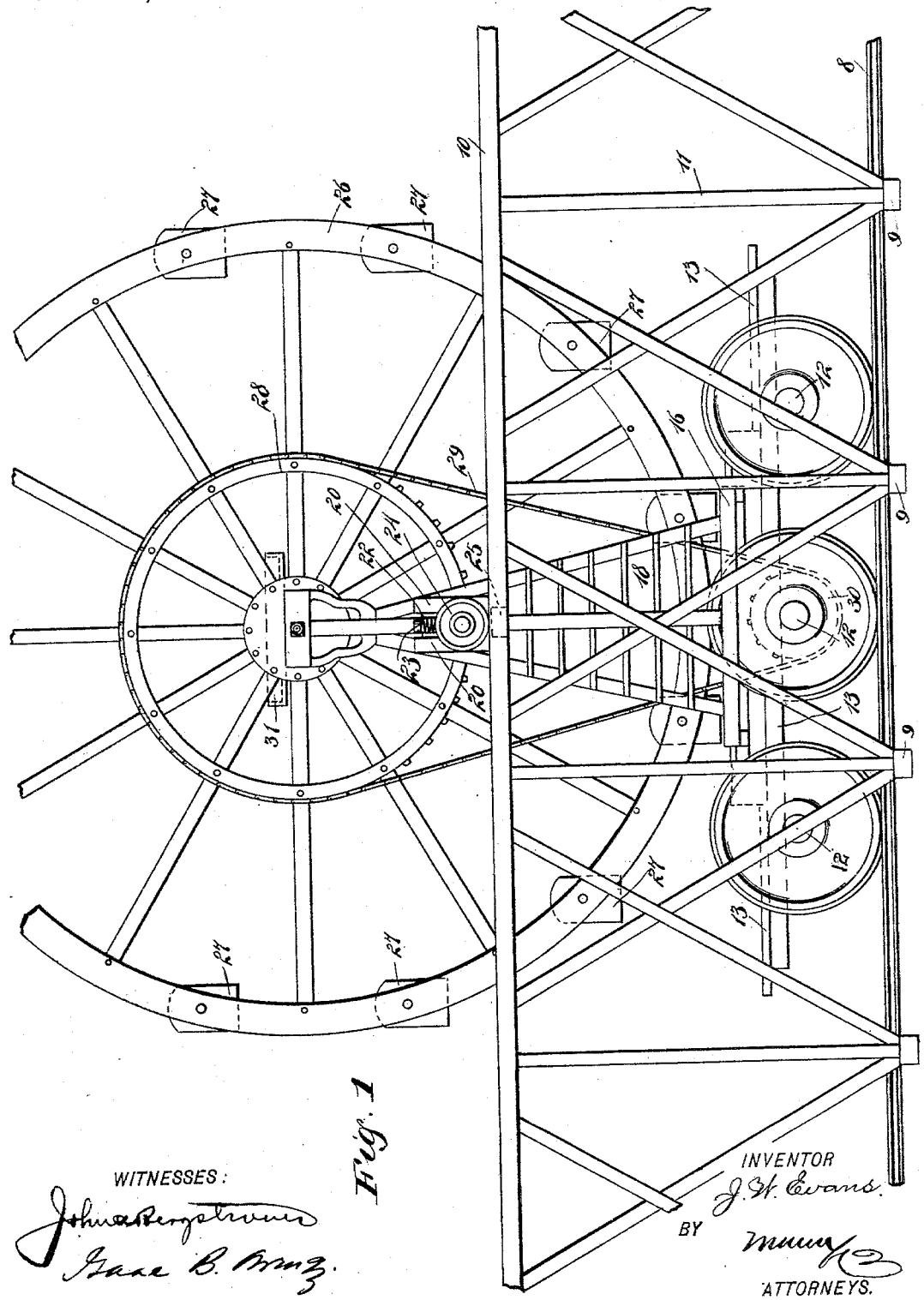

(No Model.) 3 Sheets—Sheet 1.

J. W. EVANS.
CYCLOIDAL CHARIOT.

No. 597,276. Patented Jan. 11, 1898.

WITNESSES:

INVENTOR
J. W. Evans
BY
ATTORNEYS.

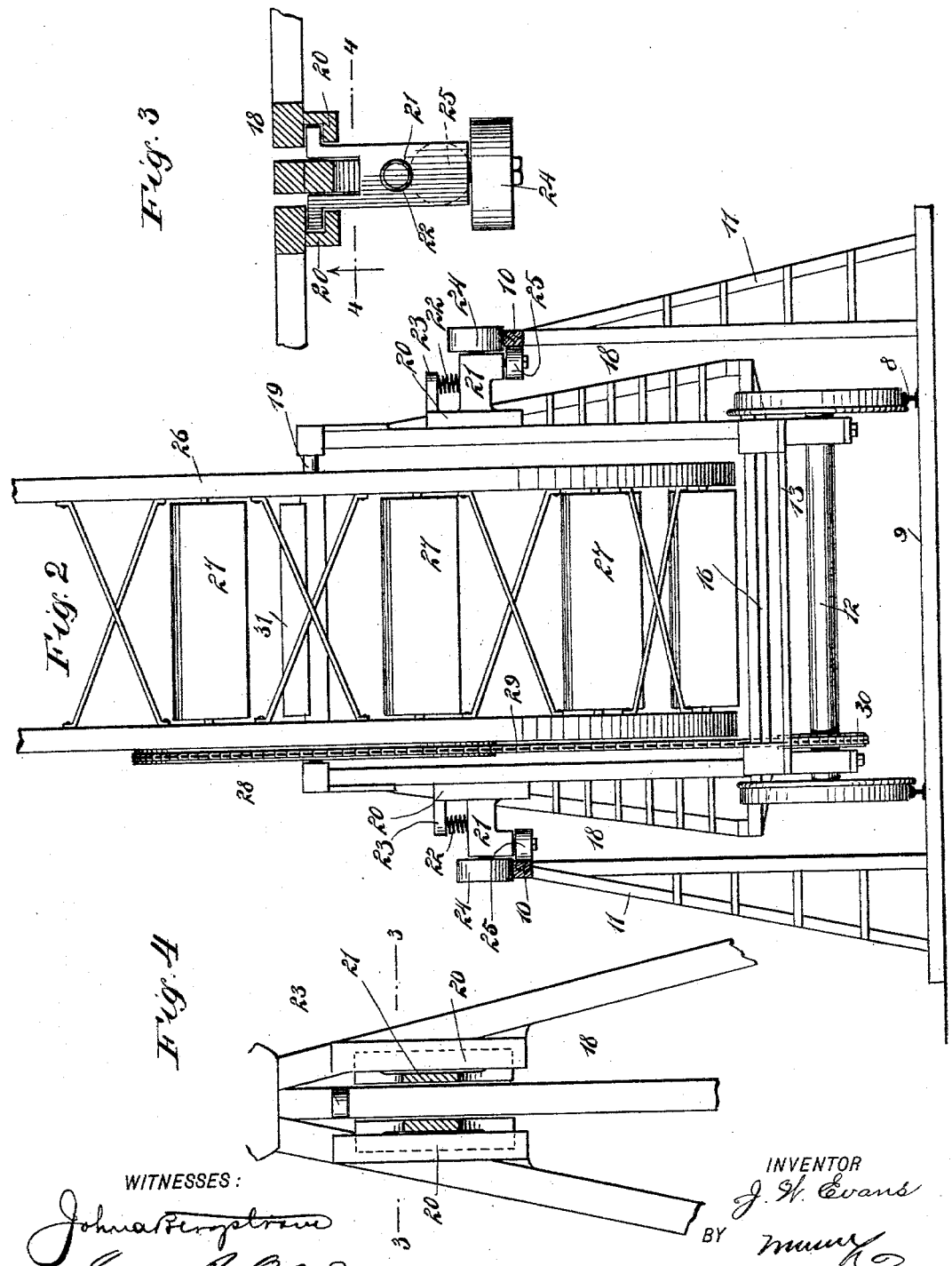

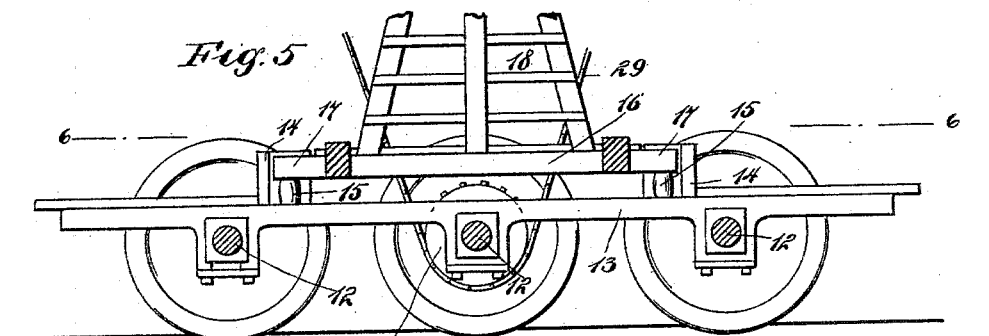

UNITED STATES PATENT OFFICE.

JOSEPH W. EVANS, OF HASKELL, TEXAS.

CYCLOIDAL CHARIOT.

SPECIFICATION forming part of Letters Patent No. 597,276, dated January 11, 1898.

Application filed April 20, 1897. Serial No. 632,947. (No model.)

*To all whom it may concern:*

Be it known that I, JOSEPH W. EVANS, of Haskell, in the county of Haskell and State of Texas, have invented a new and Improved Cycloidal Chariot, of which the following is a full, clear, and exact description.

This invention is an apparatus having a truck mounted to roll on a fixed track and carrying a wheel with pivotal carriages arranged peripherally thereon, the wheel being geared with a moving part of the truck, so that as the truck moves along the track a rotary movement will be imparted to the wheel and the passengers in the carriages will experience the sensation of a combined progressive and orbital movement.

This specification is the disclosure of one form of my invention, while the claims define the actual scope of the conception.

Reference is to be had to the accompanying drawings, forming a part of this specification, in which similar characters of reference indicate corresponding parts in all the figures.

Figure 1 is a side elevation of the invention. Fig. 2 is a front elevation thereof. Fig. 3 is a detail section on the line 3 3 of Fig. 4. Fig. 4 is an elevation, partly in section, on the line 4 4 of Fig. 3. Fig. 5 is a sectional elevation on the line 5 5 of Fig. 6. Fig. 6 is a sectional plan on the line 6 6 of Fig. 5, and Fig. 7 is a detail section taken through the axis of the wheel.

The rails 8 of the track are laid on cross-ties 9, which support at their outer ends girder-rails 10 through the medium of trusses 11, standing on the cross-ties 9.

The truck of the apparatus has three wheeled axles 12, the wheels of which roll on the rails 8. The axles 12 carry the frame 13 of the truck. The frame 13 of the truck supports four expansive springs 15, respectively surrounded by vertically - disposed angle-plates 14. Each angle-plate 14 has one member at the inner side of the corresponding spring 15 and the second member at the outer side thereof.

The wheel-frame 16 has the ends of the longitudinally-extending beams 17 respectively bearing on the springs 15 and confined by the angle-plates 14. By this arrangement the wheel-frame is supported yieldingly on the truck-frame. The wheel-frame 16 has at each side a tower 18, in the upper ends of which the axle 19 of the wheel is fixed. Fixed to each tower 18, at points just above the plane of the girder-rails 10, are two parallel guideways 20. Sliding on each pair of guideways 20 is a bracket 21. The brackets 21 are pressed downward by expansive springs 22, bearing at their upper ends against arms 23, respectively run horizontally and outward from the towers 18. Each bracket 21 carries a wheel 24 and a wheel 25. The wheels 24 respectively run on the top of the girder-rails 10 and the wheels 25 respectively run along the inner sides of said rails 10. By these means the wheel-platform is supported yieldingly, so that the wheel will be cushioned and the ride of the passengers will be easy, the springs 15 and 22 permitting all necessary swinging movement of the wheel-frame. At the same time the wheels 24 and 25, running on the girder-rails 10, prevent the chariot from lateral vibration, and consequently from the dangers of falling over.

Turning loosely on the axle 19 is the carriage or car supporting wheel 26 of the apparatus. This wheel may have any desired construction and carries pivotally at its periphery the carriages or cars 27, in which the passengers are seated. A large sprocket-wheel 28 is fixed to the wheel 26 and carries a sprocket-chain 29, which runs down through openings in the wheel-frame and around a sprocket-wheel 30, fixed to the middle axle of the truck. By these means as the truck moves along the track a rotary motion is imparted to the wheel 26, so that the carriages or cars of the wheel 26 are turned orbitally as well as advanced along the track. Fixed to the axle 19 and within the structure of the wheel 26 is a horizontal platform 31, on which persons may be seated without experiencing the orbital movement of the wheel. This platform is particularly advantageous for carrying an orchestra, which may play without being disturbed by the novel sensations incident to the movement of the wheel.

The apparatus may be propelled by any desired motive power.

Having thus described my invention, I claim as new and desire to secure by Letters Patent—

1. The combination of a truck, a wheel-frame carried on the truck, a wheel revolubly mounted in the wheel-frame and driven from the truck, and guide-wheels carried by the wheel-frame at the sides thereof.

2. The combination of a truck, a wheel-frame yieldingly mounted on the truck, a wheel revolubly mounted in the wheel-frame, and gearing driving the wheel from the truck.

3. The combination of a truck, a wheel-frame yieldingly mounted on the truck, a wheel revolubly mounted in the wheel-frame, gearing driving the wheel from the truck, and yieldingly-mounted guide-wheels at the sides of the wheel-frame.

4. The combination of a truck, a wheel-frame yieldingly mounted in the truck, a tower at each side of the wheel-frame, a wheel revolubly mounted on and between the towers, gearing driving the wheel from the truck, and guide-wheels respectively carried at the outer sides of the towers.

5. The combination of a truck, a wheel-frame carried on the truck, a wheel revolubly mounted in the wheel-frame, gearing driving the wheel from the truck, and yieldingly-mounted guide-wheels carried by the wheel-frame.

6. The combination of a truck, a revolubly-mounted wheel carried on the truck, yieldingly-mounted guide-wheels also carried on the truck, and gearing driving the first-named wheel from the truck.

7. The combination with a track consisting in base-rails, and girder-rails held elevated respectively at the sides of the base-rails, of a truck running on the base-rails, a revolubly-mounted wheel supported by and driven from the truck, and guide-wheels also supported on the truck and respectively engaging the girder-rails.

8. The combination with a track consisting in base-rails, and girder-rails held elevated respectively at the sides of the base-rails, of a truck running on the base-rails, a frame-platform carried on the truck, a tower at each side of the frame-platform, a guide-roller supported by each tower and respectively engaging the girder-rails, a wheel revolubly mounted between the towers, and gearing for driving the wheel from the truck.

9. The combination of a guideway, a bracket slidable in the guideway, a spring pressing the bracket, two guide-wheels carried by the bracket and with axes at an angle to each other, and a rail on which the guide-wheels run.

10. The combination of a truck, a wheel-frame yieldingly mounted thereon, a wheel revolubly mounted in the wheel-frame, and two guide-wheels yieldingly mounted on the wheel-frame and respectively at the sides thereof.

11. The combination of a truck, a wheel-frame having slight vertical play on the truck, springs interposed between the truck and the wheel-frame, and a wheel mounted in the wheel-frame.

12. The combination of a truck, a wheel-frame mounted thereon, a wheel mounted in the wheel-frame, and two guide-wheels respectively mounted on the wheel-frame and at the sides of the first-named wheel.

JOSEPH W. EVANS.

Witnesses:
P. D. SANDERS,
A. C. FOSTER.